US008385493B2

(12) United States Patent
Abel et al.

(10) Patent No.: US 8,385,493 B2
(45) Date of Patent: *Feb. 26, 2013

(54) METHOD AND APPARATUS FOR IMPROVING LINEARITY IN CLOCK AND DATA RECOVERY SYSTEMS

(75) Inventors: Christopher Abel, Coplay, PA (US); Joseph Anidjar, Asbury, NJ (US); Vladimir Sindalovsky, Perkasie, PA (US); Craig Ziemer, Fleetwood, PA (US)

(73) Assignee: Agere Systems LLC, Wilmington, DE (US)

( * ) Notice: Subject to any disclaimer, the term of this patent is extended or adjusted under 35 U.S.C. 154(b) by 34 days.

This patent is subject to a terminal disclaimer.

(21) Appl. No.: 12/755,522

(22) Filed: Apr. 7, 2010

(65) Prior Publication Data

US 2010/0195777 A1    Aug. 5, 2010

Related U.S. Application Data

(63) Continuation of application No. 11/375,828, filed on Mar. 15, 2006, now Pat. No. 7,724,857.

(51) Int. Cl.
*H04L 7/02* (2006.01)

(52) U.S. Cl. ........ 375/359; 375/371; 375/354; 375/355; 375/362; 375/365; 327/247; 327/237; 327/246; 714/731; 714/744; 714/775; 370/350; 370/503

(58) Field of Classification Search .................. 375/371, 375/354, 355, 359, 362, 365; 327/237, 246–248, 327/250, 355–357; 370/350, 395.62, 503, 370/509, 510, 512–514; 713/375, 400, 401; 714/731, 744, 775, 789, 798

See application file for complete search history.

(56) References Cited

U.S. PATENT DOCUMENTS

| 6,380,774 | B2 |   | 4/2002  | Saeki                   |
|-----------|----|---|---------|-------------------------|
| 6,397,042 | B1 | * | 5/2002  | Prentice et al. 455/67.14 |
| 6,693,985 | B2 |   | 2/2004  | Li et al.               |
| 7,038,510 | B2 | * | 5/2006  | Zhang ............ 327/158 |
| 7,403,584 | B2 | * | 7/2008  | Koenenkamp ...... 375/371 |
| 2002/0053931 | A1 | * | 5/2002  | Yamaguchi ......... 327/270 |
| 2003/0161430 | A1 |   | 8/2003  | Sou                     |
| 2004/0066873 | A1 |   | 4/2004  | Cho et al.              |
| 2004/0202266 | A1 |   | 10/2004 | Gregorius et al.        |

(Continued)

OTHER PUBLICATIONS

Final Office Action for U.S. Appl. No. 11/375,828, filed Mar. 15, 2006 mailed on Aug. 20, 2009.

(Continued)

*Primary Examiner* — David Ometz
*Assistant Examiner* — Rahel Guarino
(74) *Attorney, Agent, or Firm* — Mendelsohn, Drucker & Associates, P.C.; David L. Cargille; Steve Mendelsohn

(57) ABSTRACT

Disclosed is a system and method for improving the linearity of a clock and data recovery (CDR) circuit. In one embodiment, a data stream is received, and the phase of a clock signal is adjusted using two interpolators. The phase of the output signal of the second interpolator is adjusted simultaneously with, and complementary to, adjusting the phase of the first interpolator. The first interpolator's output signal is injected into a first delay cell in a delay loop having a plurality of delay cells, and the output of the second interpolator is inactivated. When the maximum phase of the first interpolator's output signal is reached, the second interpolator's output signal is injected into another one of the delay cells, and the first interpolator's output signal is inactivated. The data stream is then recovered using the output of the delay loop as a clock signal.

22 Claims, 4 Drawing Sheets

U.S. PATENT DOCUMENTS

2005/0088211 A1* 4/2005 Kim .............................. 327/158
2005/0238126 A1 10/2005 Ribo et al.

OTHER PUBLICATIONS

Office Action for U.S. Appl. No. 11/375,828, filed Mar. 15, 2006 mailed on Dec. 30, 2008.

Non-Final Office Action; Mailed on Dec. 30, 2008 for corresponding U.S. Appl. No. 11/375,828, filed Mar. 15, 2006; 11 pages.
Non-Final Office Action; Mailed on Aug. 20, 2009 for corresponding U.S. Appl. No. 11/375,828, filed Mar. 15, 2006; 13 pages.
Notice of Allowance and Fees Due; Mailed on Jan. 19, 2010 for corresponding U.S. Appl. No. 11/375,828, filed Mar. 15, 2006; 4 pages.

* cited by examiner

METHOD AND APPARATUS FOR IMPROVING LINEARITY IN CLOCK AND DATA RECOVERY SYSTEMS

CROSS-REFERENCE TO RELATED APPLICATIONS

This is a continuation of co-pending application Ser. No. 11/375,828, filed on Mar. 15, 2006, the teachings of which are incorporated herein by reference.

BACKGROUND OF THE INVENTION

1. Field of the Invention

The present invention relates generally to clock and data recovery (CDR) systems and more specifically to improving interpolator linearity in CDR systems.

2. Description of the Related Art

Clock and data recovery (CDR) operations are performed in many communication circuits. Digital communication receivers sample an analog waveform and then detect the data that the waveform represents. The phase of the analog waveform is typically unknown and there may be a frequency offset between the frequency at which the original data was transmitted and the nominal receiver sampling clock frequency. The CDR function is used to properly sample an analog waveform using a reference clock to correctly recover the data.

FIG. 1 shows a block diagram of a prior art CDR circuit 100. The CDR circuit 100 receives as input a reference clock 140 and an analog data stream 104 that represents digital bits (i.e., 1s and 0s), and provides as output a recovered clock 110 and recovered data 106. The data stream 104 is often a differential waveform as represented by waveform 108. The differential waveform 108 has multiple so-called "eyes" 112 which represent the maximum and minimum amplitude of the data stream 104 during a time interval. The waveform 108 has transition points, such as transition points 120, 124, that indicate the transition from one eye to the next. Each eye also has a respective midpoint (e.g., midpoint 116 of eye 112).

The CDR circuit 100 includes a series of latches 134 that are clocked from a clock signal 126 to sample the data stream 104 at the midpoint 116 of the eye 112. The midpoint 116 of the eye 112 is typically sampled because the CDR circuit often has the best chance of correctly identifying whether the waveform is representing a digital 0 or a digital 1 at that instant in time. The CDR circuit 100 determines each transition point (e.g., transition point 120 and 124) and the midpoint 116 of the eye 112.

Due to imperfections and nonlinearities in the transmission device or transmission medium, or offset between the transmit and receive frequencies, the data signal may shift in time during the transmission relative to the clock signal. This shifting in time may result in the differential waveform 108 moving (back and forth or in one direction over time with respect to the reference clock 140) as it is being received by the CDR circuit 100.

The CDR circuit 100 determines this time shifting in order to ensure that the CDR circuit 100 samples each eye 112 of the waveform 108 at its midpoint 116. The CDR circuit 100 determines the transition point 120 and 124 and midpoint 116 of each eye 112 and then changes the phase of an output signal 126 of an interpolator 128 of the CDR circuit 100, via a control signal 130. The CDR circuit 100 samples the input data stream 104 at points determined by the phase of the output signal 126 of the interpolator.

To change the phase of the output signal 126, input clock signal 140 is delayed, creating a new clock signal 144. These clock phases are connected to each input 132, 136 of the interpolator 128. In other words, one input clock signal 144 is delayed with respect to the other input clock signal 140. These two input signals provide the minimum phase and the maximum phase for the interpolator 128.

As the phase of the interpolator 128 is changed, however, the input impedance of each input 132, 136 of the interpolator 128 also changes. This variation in input impedance results in an amplitude variation of the input clock signals 140, 144. This, in turn, results in an undesirable change in the phase of the input clock signals 140, 144 relative to each other.

Thus, the prior art interpolator (and, therefore, CDR circuit) does not change phases in a smooth, linear manner. Instead, the phase of the prior art interpolator's output signal 126 changes as a result of an impedance variation with respect to the interpolator's inputs. As a result, the input data stream 104 may not be sampled correctly.

BRIEF SUMMARY OF THE INVENTION

In accordance with the present invention, an interpolator of a clock and data recovery (CDR) circuit is designed to have a linear delay change as the phase of its output signal changes from one phase to the next. A CDR circuit receives a data stream and adjusts a phase of a clock signal using two interpolators. The data stream is then recovered using the clock signal.

The CDR circuit has a first interpolator that includes a first input for receiving a first input signal and a second input for receiving a second input signal. The CDR circuit also has a second interpolator that includes a first input for receiving the first input signal and a second input for receiving the second input signal.

The first interpolator includes an output connected to a delay loop that comprises a plurality of delay cells. In one embodiment, the first interpolator's output is connected with one of a first portion of the plurality of delay cells. Similarly, the second interpolator includes an output connected with the delay loop. In one embodiment, the second interpolator's output is connected to a second portion of the plurality of delay cells.

The first input signal is a first clock signal and the second input signal is a second clock signal. In one embodiment, the second clock signal is delayed by a delay cell with respect to the first clock signal.

The phase of the output signal of the second interpolator is adjusted simultaneously with and complementarily to the adjusting of the phase of the first interpolator. The first interpolator's output signal is injected into a first delay cell in the plurality of delay cells and the output of the second interpolator is inactivated. When the maximum phase of the output signal of the first interpolator is reached, the second interpolator's output signal is injected into another one of the delay cells in the plurality of delay cells. The first interpolator's output signal is inactivated.

These and other advantages of the invention will be apparent to those of ordinary skill in the art by reference to the following detailed description and the accompanying drawings.

DETAILED DESCRIPTION

Figure 1:
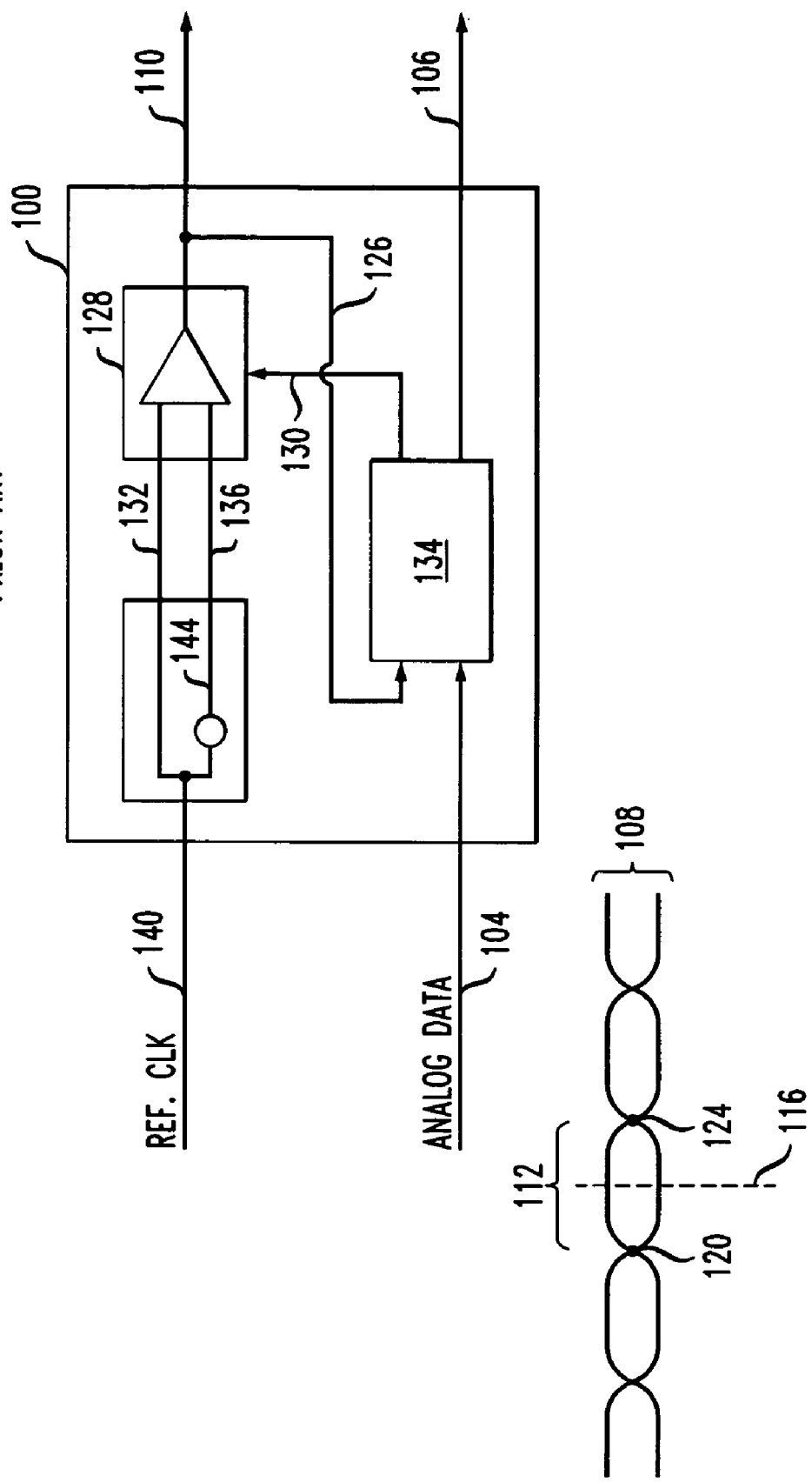
FIG. 1 is a block diagram of a prior art clock and data recovery (CDR) circuit.
Figure 2A:
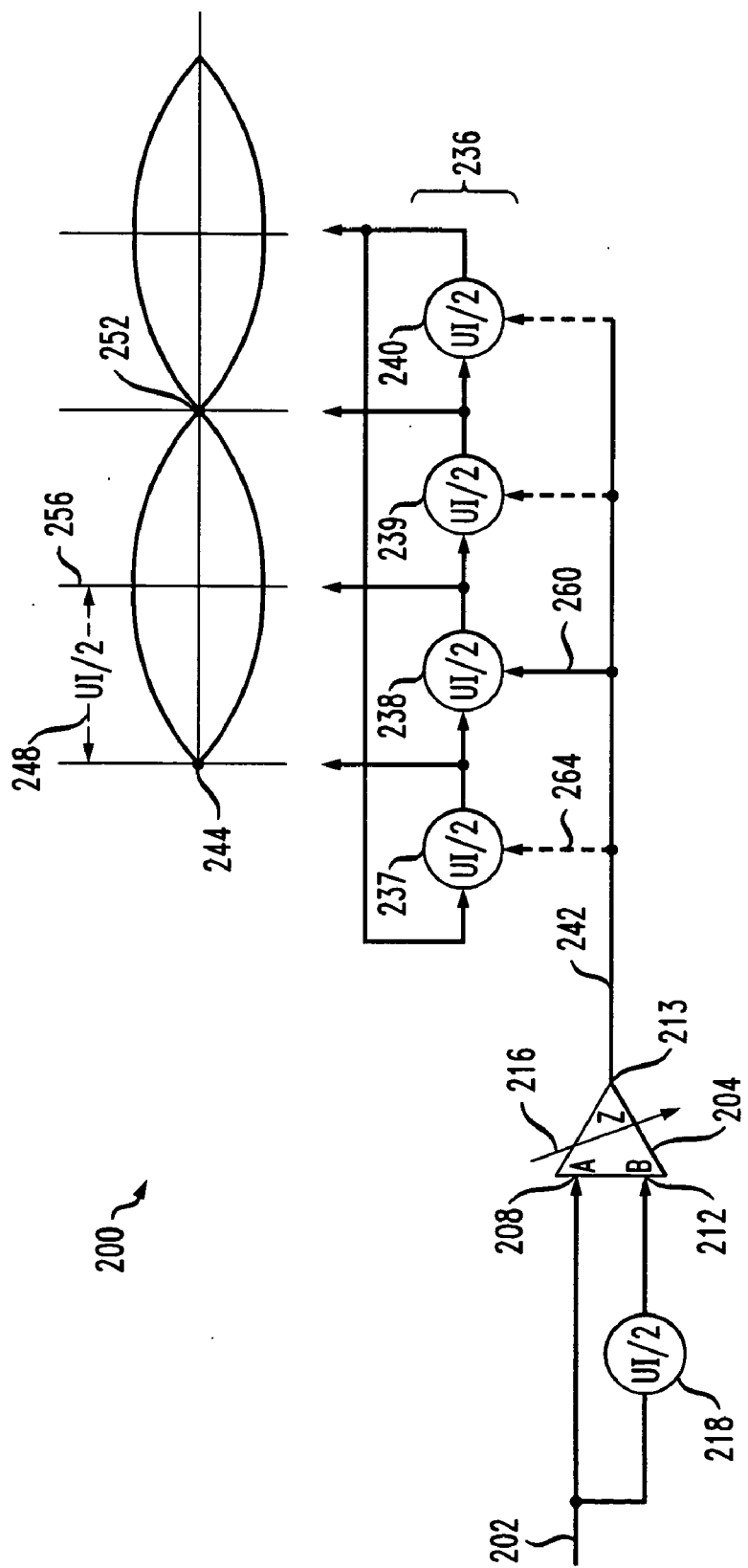
FIG. 2A is a more detailed block diagram of a prior art CDR circuit.

FIG. 2A shows a more detailed block diagram of a prior art CDR 200. The CDR 200 includes a fixed reference clock signal 202. The CDR 200 also includes an interpolator 204 having inputs A 208 and B 212 and output Z 213. The interpolator 204 has a control 216 that enables the programming of the interpolator 204 to output a signal having one of a predetermined number of phases, such as one of 16 different phase possibilities. In one embodiment, the control 216 is a digital control. Thus, control 216 enables the programming of the phase of the output signal of the interpolator 204.

The inputs A 208 and B 212 of the interpolator 204 receive two signals having different phases. One input corresponds to one extreme of the possible phases that the output signal can have while the other input corresponds with the other extreme of the possible phases that the output signal can have. To generate the extremes for the phases, a delay cell 218 before the input B 212 of the interpolator 204 is included to delay the clock signal received by input B 212 with respect to the clock signal received by input A 208. The delay cell 218 can be located at input A 208 or input B 212.

Figure 2B:
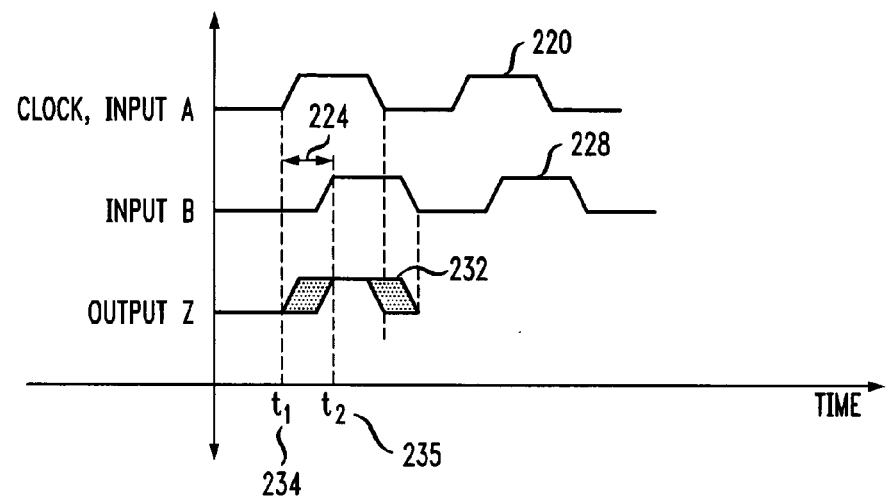
FIG. 2B shows timing diagrams of input and output signals of an interpolator in the prior art CDR circuit of FIG. 2A.

FIG. 2B shows timing diagrams representing the clock signal 202 and the inputs 208, 212 and output 213 of the interpolator 204. The clock signal 202 and, therefore, input A 208 can be represented by a first waveform 220. Input B 212 has been delayed a predetermined time 224 because of delay cell 218. The waveform that is provided into input B 212 is shown as waveform 228. Utilizing control 216 of the interpolator 204, the delay or phase associated with waveform 232 that is the output of output Z 213 can be varied from the starting phase associated with waveform 220 to the ending phase (i.e., delay 224) of the waveform 228. Thus, the possible start phase and end phase of waveform 232 is controlled by the control 216 of the interpolator 204 and can be anywhere between time $t_1$ 234 and time $t_2$ 235. If the control 216 is set to its minimum value, the interpolator's output Z 213 is the same as the waveform 220. If the control 216 is set to its maximum value, the interpolator's output Z 213 is the same as the waveform 228. These phase variations are shown with numerous lines in waveform 232.

The CDR 200 includes delay loop 236 having output delay cells 237, 238, 239, 240. Output signal 242 of output Z 213 is delayed by one or more delay cells 237-240 of the delay loop 236. Specifically, the output signal 242 is provided to one of the delay cells 237-240 and is then propagated through the rest of the delay cells 237-240 in the loop 236. For example, if the output signal 242 is provided to delay cell 238, the output signal 242 then travels to delay cell 239, then to delay cell 240, and then wraps around to delay cell 237. Each delay cell 218, 237-240 can have a predetermined delay or can be set by an external signal or circuit. The output of each delay cell 237-240 represents the location of either a transition point (e.g., transition points 244, 252) of an eye 248 or the midpoint 256 of the eye 248. In one embodiment, the amount of delay corresponding with the delay cell 218, 237-240 is equal to half of a unit interval (UI), where a unit interval is the time associated with each eye (e.g., eye 248).

Specialized control logic (not shown) in the CDR monitors the centering of the sampling and transition clocks with respect to the data stream. If the clocks become uncentered with respect to the data stream (e.g. the data stream is delayed from the sampling clocks), the interpolator 204 is instructed via the control 216 to further delay the phase of its output signal. Eventually, the phase of the output signal 242 reaches its maximum delay (i.e., waveform 232 matches waveform 228). If the CDR 200 determines that additional phase delays are needed to sample the midpoint 256, the control 216 resets the interpolator 204 back to the starting phase. At the same time, to offset a large phase change, the injection point of the output signal 242 into the delay loop 236 is moved back a delay cell 237-240. Thus, if the interpolator 204 used an injection point 260 to sample the midpoint 256 and the control 216 resets the phase back to the beginning phase, then the injection point is also changed to a second injection point 264 so that there are now two delay cells before sampling the midpoint 256. This is to prevent a large jump in phase when the control 216 reaches the last setting for the phase.

The disadvantages associated with the prior art CDR architecture is as follows. The phase of the interpolator 204 is adjusted by changing the dc bias on the circuitry associated with the interpolator inputs A 208 and B 212. As a result, as the phase of the output 213 (i.e., output signal 242) of the interpolator 204 is adjusted from one extreme to the other, the input impedance of each input A 208 and B 212 of the interpolator 204 also changes. The change in input impedance results in an amplitude and phase variation of the input clock signal 202 based on the impedance at each input 208, 212. Thus, as the phase of the interpolator 204 is changed by the control 216, the amplitude and phase of the input clock signal 202 also varies. This, in turn, results in a change in the delay 224 between the two clock signals provided to the two inputs 208, 212. The delay 224 is important because it is used to generate the predetermined number of output phases.

Figure 3:
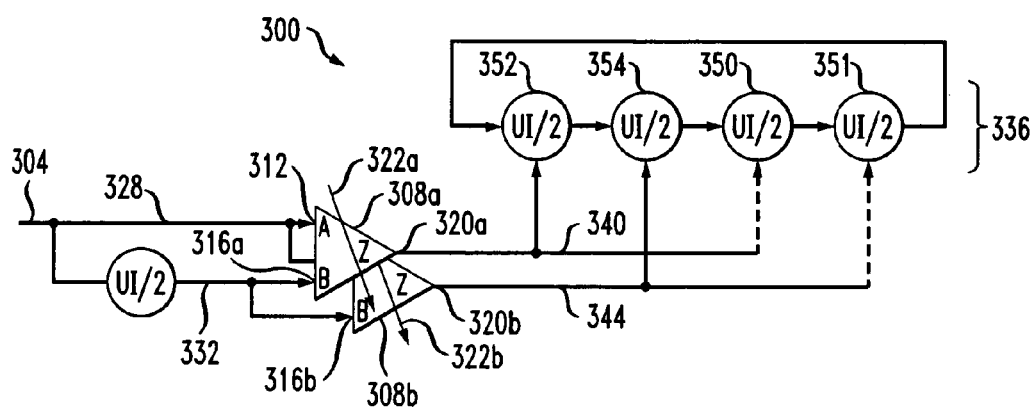
FIG. 3 shows a block diagram of a CDR circuit in accordance with an embodiment of the present invention.

FIG. 3 shows a block diagram of a CDR circuit 300 in accordance with an embodiment of the present invention. A reference clock signal 304 provides the input clock signal to two interpolators 308a, 308b. Each interpolator 308a, 308b has an A input (e.g., a first A input 312 for interpolator 308a and a second A input (not shown)) for interpolator 308b and a B input (e.g., a first B input 316a for interpolator 308a and a second B input 316b for interpolator 308b). Each interpolator 308a, 308b also includes a Z output 320a, 320b and a control 322a, 322b, respectively.

In accordance with an embodiment of the present invention, clock signal 328 is provided to the A input of each interpolator 308a, 308b. Similarly, clock signal 332 (after delay cell 324) is provided to the B input of each interpolator 308a, 308b.

As described above, the CDR circuit 300 includes first delay cell 324 positioned before the B inputs of the interpolators 308a, 308b to provide delay between the clock signal 332 provided to the B inputs and the clock signal 328 provided to the A inputs of the interpolators 308a, 308b. As described above, the CDR circuit 300 also includes delay loop 336 having delay cells 350-354.

In operation, one interpolator's output is active while the other interpolator's output is set to be inactive. In one embodiment, a multiplexor (MUX) enables one output to be active and the other to be inactive.

The active interpolator's phase is then changed from one extreme (e.g., a minimum phase delay) to the other (e.g., a maximum phase delay). For example, suppose the first interpolator 308a is active (i.e., its output is active) while the second interpolator 308b is inactive (i.e., its output is inactive). Also suppose that each control 322a, 322b accepts a four bit word as its input. The first control 322a is adjusted from the first extreme (e.g., 0000) to the second extreme (e.g., 1111) to vary the phase of the first interpolator 308a.

At the same time, the inactive interpolator's phase control 322b is adjusted in a complementary manner. This means that the phase of the inactive interpolator is adjusted in the opposite direction as the phase of the active interpolator. The value of the inactive interpolator's phase control is the inverse of the value of the active interpolator's phase control. The second control 322b is therefore adjusted from the second extreme (e.g., 1111) to the first extreme (e.g., 0000). Although this second interpolator 308b is not being used (i.e., its output 320b is inactive), the input impedance associated with the A input of the first interpolator 308a is adjusted in the opposite direction as the input impedance associated with the A input of the second interpolator 308b. Similarly, the input impedance associated with the B input of each interpolator 308a, 308b is also adjusted in opposite directions. Because the input impedances of the same input for each interpolator 308a, 308b are adjusted in opposite directions, they end up balancing each other out (because the same inputs on each interpolator are connected together in parallel) and remain relatively constant. As a result, the amplitude and phase associated with each input signal 328, 332 remains relatively constant because the input impedance remains relatively constant as the phase is varied for each interpolator 308a, 308b. Furthermore, the delay between the A and B inputs of the interpolators 308a, 308b also remains relatively constant because of the balancing of the impedance.

For example, suppose the first interpolator 308a is active and the injection point is set to delay cell 350. The first interpolator 308a starts at the lowest phase and the control 322a increments the phase up to the maximum phase. At the same time, the phase of the second interpolator 308b is transitioned from the maximum phase down to the minimum phase. When the interpolator 308b is set to produce an output signal having a minimum phase, the injection point is then changed to second delay cell 354, the first interpolator 308a is made inactive, and the second interpolator 308b is made active. The normal transition time needed to transition one interpolator from its maximum phase back to its minimum phase is eliminated because the second interpolator is already at the minimum phase (i.e., the starting point for the new injection point).

Additionally, the loading placed on the output 320a, 320b for each interpolator 308a, 308b is reduced (by half) relative to the output of the interpolator of the prior art CDR circuit 200. In particular, in accordance with the present invention, each interpolator 308a, 308b is connected to two delay cells 336 while the prior art interpolator is connected to all four delay cells. This results in less loading on the output of each interpolator 308a, 308b.

Figure 4:
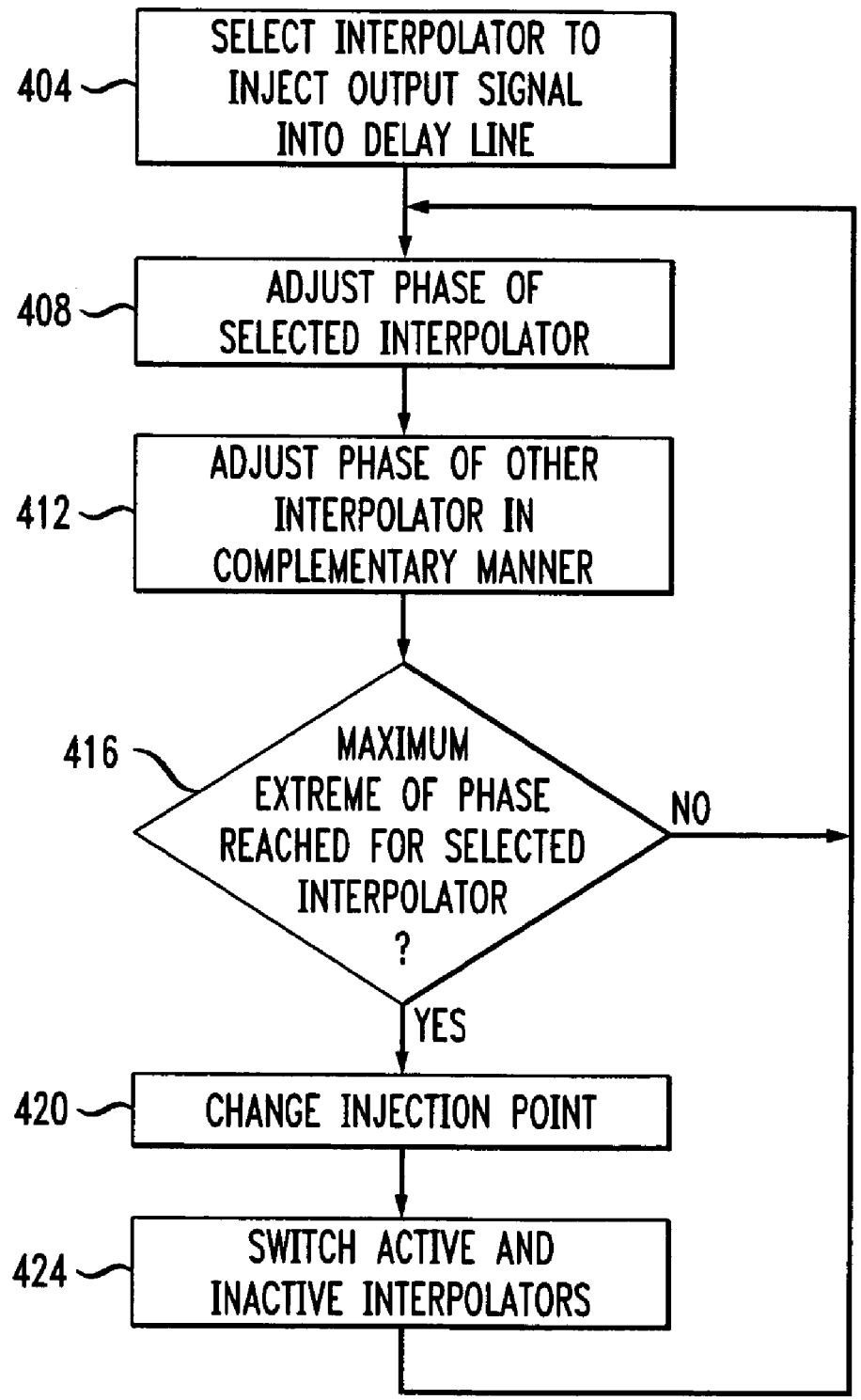
FIG. 4 is a flowchart of the steps performed by a CDR circuit in accordance with an embodiment of the present invention.

FIG. 4 is a flowchart showing the steps performed by the CDR circuit 300 to provide a linear transition between phase changes. One interpolator is selected to inject its output signal (e.g., a first output signal 340 or a second output signal 344) into delay line 336 in step 404. The phase control for the selected interpolator is adjusted in step 408. At the same time, the other interpolator's phase is adjusted in a complementary manner with respect to the selected interpolator in step 412. The circuit then determines whether the maximum extreme has been reached with respect to the selected interpolator in step 416. If not, the phase for each interpolator is incremented again. If the maximum has been reached with respect to the selected interpolator, then the minimum has been reached with respect to the inactive interpolator. The circuit then moves the injection point to the previous delay cell in step 420 and then switches the active and inactive interpolators in step 424. The interpolator that recently became the active interpolator was at the minimum phase setting. The process repeats itself by returning to step 408. Note that phase changes in the interpolator and injection point changes can move in either direction, as needed to center the sampling clocks on the midpoint of the data eye.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A clock and data recovery circuit, comprising:
   a first interpolator comprising a first input for receiving a first input signal and a second input for receiving a second input signal;
   a second interpolator comprising a first input for receiving said first input signal and a second input for receiving said second input signal; and
   control logic adapted to (i) adjust a phase of an output signal of said first interpolator and (ii) adjust a phase of an output signal of said second interpolator complementarily to said phase of said first interpolator.

2. The clock and data recovery circuit of claim 1, further comprising a delay loop connected to at least one of said first and second interpolators.

3. The clock and data recovery circuit of claim 2, wherein said delay loop comprises a plurality of delay cells.

4. The clock and data recovery circuit of claim 3, wherein an output of said first interpolator is connected to a first portion of said plurality of delay cells.

5. The clock and data recovery circuit of claim 4, wherein an output of said second interpolator is connected to a second portion of said plurality of delay cells.

6. The clock and data recovery circuit of claim 1, wherein said first input signal is a first clock signal and said second input signal is a second clock signal.

7. The clock and data recovery circuit of claim 1, wherein said first interpolator further comprises a first control to adjust a phase of an output signal of said first interpolator.

8. The clock and data recovery circuit of claim 1, wherein said second interpolator further comprises a second control to adjust a phase of an output signal of said second interpolator.

9. A method for improving linearity of a clock and data recovery (CDR) circuit comprising a first interpolator and a second interpolator, each interpolator comprising a first input for receiving a first input signal and a second input for receiving a second input signal, the method comprising:

adjusting a phase of an output signal of said first interpolator; and adjusting a phase of an output signal of said second interpolator complementarily to said adjusting of said phase of said first interpolator.

10. The method of claim 9, further comprising injecting said output signal of said first interpolator into a first delay cell in a plurality of delay cells.

11. The method of claim 10, further comprising inactivating said output signal of said second interpolator.

12. The method of claim 9, wherein the phase of the output signal of said second interpolator is adjusted simultaneously with said adjusting of the phase of the output signal of said first interpolator.

13. The method of claim 9, wherein:
the phase of the output signal of said first interpolator is adjusted in a first direction; and
the phase of the output signal of said second interpolator is adjusted in a direction opposite to the first direction.

14. The method of claim 9, wherein a value of a phase control of said second interpolator is an inverse of a value of a phase control of said first interpolator.

15. A method for improving linearity of a clock and data recovery (CDR) circuit, the method comprising:
receiving a data stream;
adjusting a phase of a clock signal using a first interpolator and a second interpolator ; and
recovering said data stream using said clock signal, wherein said adjusting a phase of a clock signal further comprises adjusting a phase of an output signal of said first interpolator and adjusting a phase of an output signal of said second interpolator complementarily to said adjusting of said phase of said output signal of said first interpolator.

16. The method of claim 15, wherein said adjusting of a phase of a clock signal further comprises alternating between said first and second interpolators.

17. The method of claim 15, further comprising receiving a first clock signal at a first input of said first interpolator and at a first input of said second interpolator.

18. The method of claim 17, further comprising receiving a second clock signal at a second input of said first interpolator and a second input of said second interpolator.

19. The method of claim 18, wherein said receiving of said second clock signal further comprises receiving a delayed first clock signal.

20. The method of claim 15, further comprising injecting said output signal of said first interpolator into a first delay cell in a plurality of delay cells.

21. The method of claim 20, further comprising inactivating said output signal of said second interpolator.

22. The method of claim 15, wherein the phase of the output signal of said second interpolator is adjusted simultaneously with said adjusting of the phase of the output signal of said first interpolator.

* * * * *